United States Patent [19]
Edgerton

[11] Patent Number: 5,604,391
[45] Date of Patent: Feb. 18, 1997

[54] ARMATURE

[75] Inventor: Douglas A. Edgerton, Wallington, Great Britain

[73] Assignee: Watliff Company Limited, London, England

[21] Appl. No.: 651,531

[22] Filed: May 22, 1996

Related U.S. Application Data

[63] Continuation of Ser. No. 302,919, filed as PCT/GB93/00617, Mar. 25, 1993 published as WO93/19502, Sep. 30, 1993, abandoned.

[30] Foreign Application Priority Data

Mar. 26, 1992 [GB] United Kingdom ............... 9206637

[51] Int. Cl.⁶ .................................................. H01R 39/32
[52] U.S. Cl. ................................................ 310/234; 29/597
[58] Field of Search ............................. 310/234; 29/597; 219/78.01, 121.14

[56] References Cited

U.S. PATENT DOCUMENTS

| | | | |
|---|---|---|---|
| 3,223,869 | 12/1965 | Reisnecker | 310/234 |
| 3,522,462 | 8/1970 | Schwartz | 310/234 |
| 3,861,027 | 1/1975 | Allen | 29/597 |
| 5,113,574 | 5/1992 | Nuss | 29/597 |

FOREIGN PATENT DOCUMENTS

| | | | |
|---|---|---|---|
| 1550106 | 11/1968 | France | 29/597 |
| 2511102 | 9/1975 | Germany | H01R 38/32 |
| 3017426A1 | 11/1981 | Germany | H01R 39/32 |
| 3437744A1 | 4/1986 | Germany | H01R 39/32 |
| 0131705 | 10/1979 | Japan | 310/234 |
| 0229649 | 11/1985 | Japan | 29/597 |
| 4168955 | 6/1992 | Japan | 310/234 |
| 1446162 | 8/1976 | United Kingdom | B23K 19/04 |

Primary Examiner—Thomas M. Dougherty
Attorney, Agent, or Firm—Oliff & Berridge

[57] ABSTRACT

A method for assembling a high current commutator and winding to form an armature includes positioning end portions of pairs of conductors against a connection portion of a segment on the commutator. A support member is engaged with the connection portion while a connection member, such as an electrode or sonotrode, applies energy to fuse together the stack formed by the connection portion and the conductor ends together. The connection member and the support member are then disengaged from the stack after the stack is fused together. The apparatus for assembling the armature includes connection member and the support member. The support member confines the securing energies to the stack thus allowing the commutator segments, connection portions and a core of the commutator to be made lighter.

15 Claims, 5 Drawing Sheets

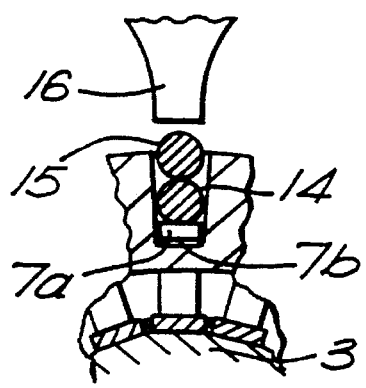
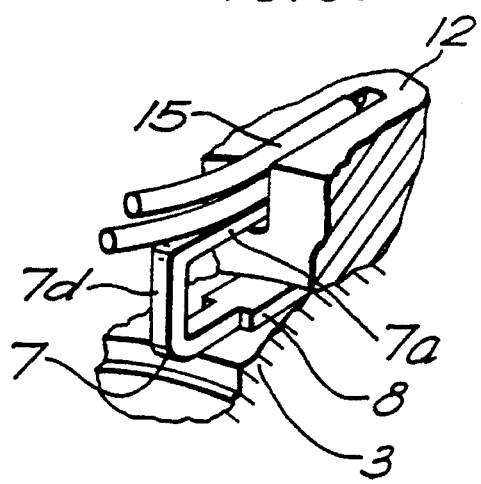
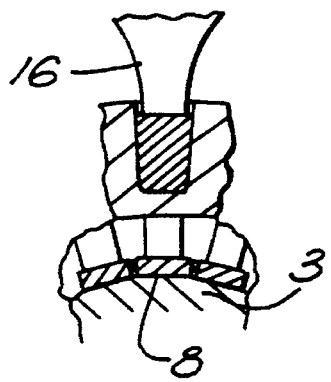
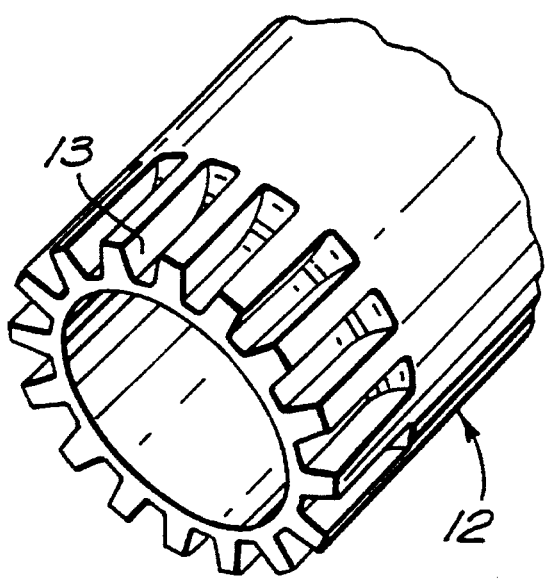

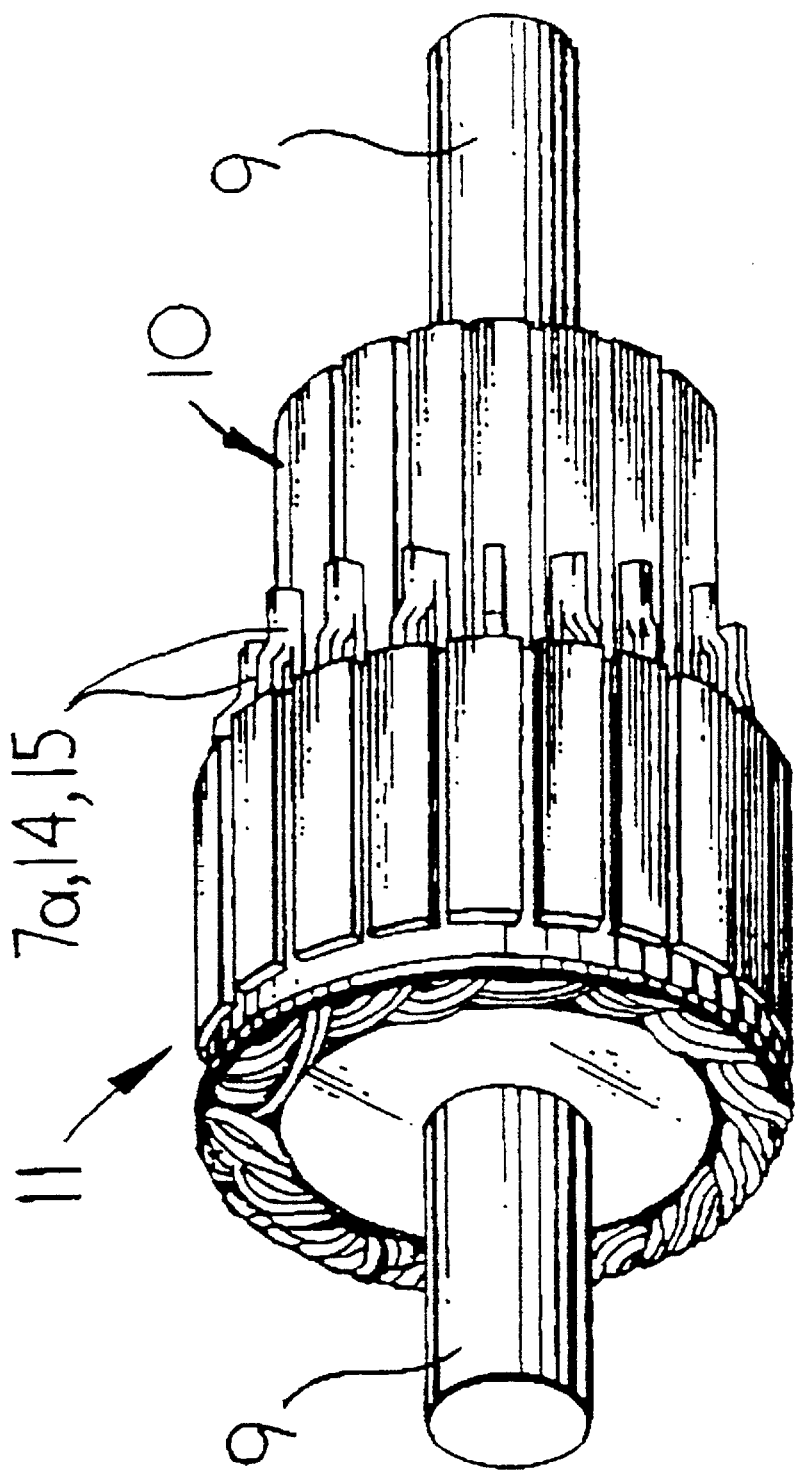

PERMANENT MAGNET MOTOR WITH RADICALLY MAGNETIZED ISOTROPIC PERMANENT MAGNET CYLINDRICAL YOKE

BACKGROUND OF THE INVENTION

This invention relates to an electric motor with permanent-magnet excitation, having motor pans which are movable relative to one another, of which one motor pan forms a multi-pole excitation field in an air gap by means of permanent magnets and the other motor part comprises a coil configuration situated in this air gap, the permanent-magnetically excited motor pan comprising a cylindrical yoke having substantially radial slots, which are uniformly spaced about the circumference and in which permanent magnets are mounted, which permanent magnets are magnetised in a circumferential direction with directions of magnetisation which change from magnet to magnet.

The generation of multi-pole magnet fields is one of the most important technical uses of permanent magnets, most of these components being used in permanent-magnet motors. These components may have different shapes. The most important shapes include rotationally symmetrical disks, which produce a multi-pole magnetic field in an axial direction, rectangular blocks, which generate a multi-pole field directed perpendicularly to one of the block surfaces, and cylinders or hollow cylinders, which generate a multi-pole magnetic field in a radial direction.

DE 36 07 648 C2, which corresponds to U.S. Pat. No. 4,679,313 Jul. 14, 1987 discloses a motor in which permanent-magnet annular segments are arranged on an iron sleeve, thus forming a cylindrical permanent-magnet rotor. The permanent magnets are magnetised in such a manner that in the direction of the air gap each north pole is followed by a south pole. The rotor is surrounded by a cylindrical stator without winding slots. The winding is arranged in the air gap between the permanent-magnet rotor and a soft-magnetic stator sleeve.

If only those materials which are currently used in large quantities are considered, these segments can be made either of ferrites, which are cheap but which generate comparatively weak magnetic fields, or rare-earth materials, which are expensive but which produce strong magnetic fields.

For both groups of materials a distinction is made between sintered and resin-bonded materials. The sintered materials are anisotropic, as a result of which the magnetic fields produced by them are stronger than those produced by the isotropic resin-bonded materials. The disadvantage of sintered materials is that they can be manufactured only in simple shapes and these shapes are anisotropic only in a few directions which are dictated by physical properties. Therefore, only simple magnetisation patterns can be produced. Moreover, it is very difficult to manufacture sintered magnets with narrow tolerances of their mechanical dimensions. Conversely, resin-bonded materials have the advantage that components with complicated geometries and narrow mechanical tolerances can be manufactured at low cost and that by means of a suitable magnetisation process it is also possible to obtain intricate magnetisation patterns in the material.

A problem when generating multi-pole radial magnetic fields is that to date cylinders or hollow cylinders with radial anisotropy cannot be manufactured in an industrial process. It is possible to manufacture cylinders or hollow cylinders with diametral anisotropy, but these are only capable of generating two-pole magnetic fields and are therefore not suitable for uses requiring magnetic fields with a larger number of poles.

The manufacture of the rotors described in DE 36 07 648 C2 is intricate because the permanent-magnetic annular segments each have to be glued onto the rotor sleeve. To guarantee a reliable operation rotor binding is necessary. Large magnetic fields can be obtained when the magnet segments are made of an anisotropic material. However, even the production of annular segments from an anisotropic material is already very intricate.

From DE 42 16 938 (PHD 92.057) a permanent-magnet rotor is known which consists of an iron yoke having radial slots in which block-shaped permanent magnets are mounted. These permanent magnets are magnetised circumferentially and have a direction of magnetisation which changes from magnet to magnet in the circumferential direction. These rotors can be manufactured more simply than the rotors known from DE 36 07 648 C2. Gluing the blocks into the slots is not a problem. No additional fastening is required. Their simple geometry allows the block-shaped magnets to be simply made of an anisotropic material and to be subsequently magnetised so that large magnetic fields can be produced.

SUMMARY OF THE INVENTION

It is an object of the invention to provide a rotor for an electric motor of the type defined in the opening paragraph, which in comparison with the known constructions generates a substantially larger magnetic field in the air gap, so as to produce a larger torque for a given current in the coil configuration.

According to the invention this object is achieved in that the cylindrical yoke consists of an isotropic permanent-magnet material which in yoke portions between the permanent magnets in the slots is predominantly radially magnetised with such a polarity that the polarity of the resulting magnetic field in the air gap corresponds to the polarity of the magnetic field produced by the permanent magnets in the slots, and in that the permanent magnets in the slots consist of an anisotropic permanent-magnet material.

In this way it is achieved that the yoke actively contributes to the generation of the multi-pole magnetic field.

In a further embodiment of the invention the slots have an inclination between –30° and +30° relative to the radial direction. By varying this inclination it is possible to adapt the shape of the magnetic field in the air gap and, consequently, the voltage induced in the coil configuration to specific requirements.

In a further embodiment of the invention the coil configuration consists of curved foil windings. This provides a higher copper factor in the case of a flat construction.

In a further embodiment of the invention the coil configuration consists of curved preformed wound coils. Such a coil configuration can be manufactured economically.

In a further embodiment of the invention a cylindrical yoke of a soft-magnetic material is disposed at the side of the air gap which faces the permanent magnet, behind the coil configuration, which yoke is fixedly connected to the coil configuration.

In a further embodiment of the invention a cylindrical yoke of a soft-magnetic material is disposed at the side of the air gap which faces the permanent magnet, behind the coil configuration, which yoke is fixedly connected to the permanent magnet. This has the advantage that the rotor no longer induces any alternating fields in the cylindrical yoke, so that iron losses no longer occur.

BRIEF DESCRIPTION OF THE DRAWING

The invention will now be described in more detail with reference to the drawings. In the drawings:

FIG. 3 is a sectional view of the rotor with permanent magnets mounted in slots which are inclined relative to the radial direction.

DESCRIPTION OF THE PREFERRED EMBODIMENTS

Figure 1A:
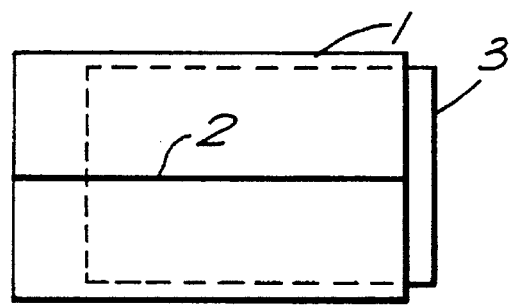
FIG. 1 shows an example relating to a spindle motor having a cylindrical rotor.
Figure 1B:
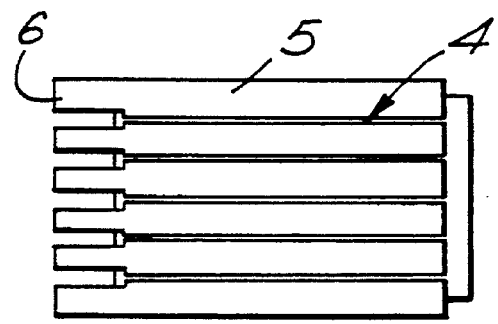
Figure 1C:
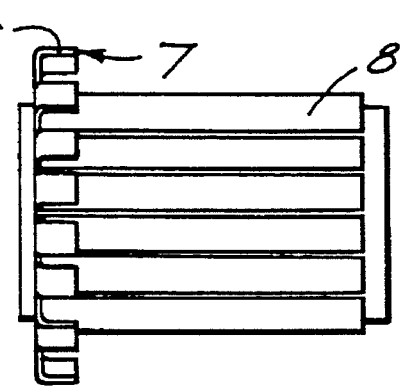

FIG. 1 is a sectional view of a spindle motor 1a, intended particularly as a drive motor for hard disk drives in data processing equipment. A motor shaft 2 of this spindle motor 1a is fixedly connected to a disk 3 of a hard disk housing, not shown. Bearings 4, 5a and 5b support a rotatable hub 6 on the motor shaft 2. The hub 6 has an inner hub portion 6a surrounding the motor shaft 2 and carrying a permanent-magnet cylindrical rotor 7 on its outer circumference 6b. The field generated by the rotor magnet 7 at its outer circumference 7a extends perpendicularly to the axis of rotation 16. The motor shaft 2 carries a mounting plate 8. This mounting plate carries externally a coil configuration 9, which belongs to the motor, and a yoke 10. The hub 6 further has an outer hub portion 6c, which surrounds the yoke 10.

The coil configuration 9 may consist of a curved foil winding or of curved preformed wound coils. With the present motor construction the mounting plate 8 carries the sleeve-shaped soft-magnetic yoke 10 at the outer circumference 9a of the coil configuration 9. With this construction two air gaps 11 and 12 are formed, one air gap 11 separating the yoke 10 from the hub 6 and the other air gap 12 separating the rotor magnet 7 from the coil configuration 9.

Figure 2:
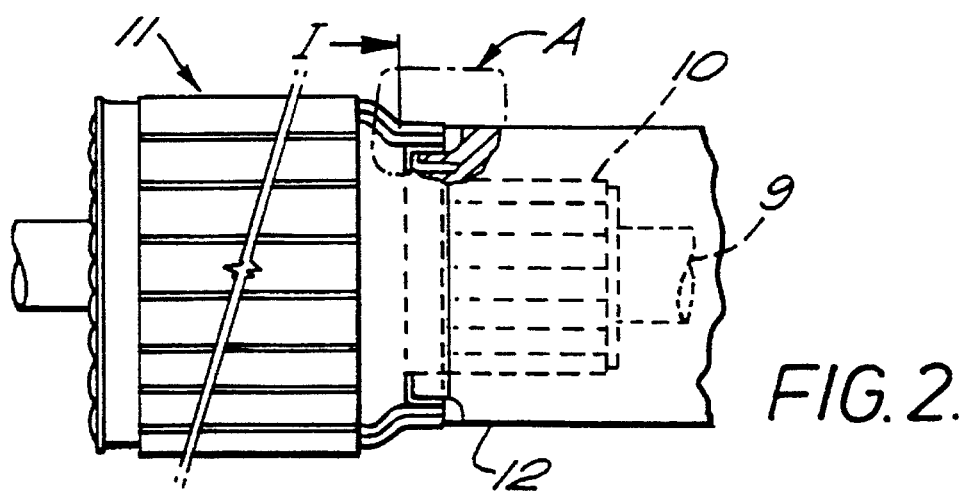
FIG. 2 is a sectional view of the rotor with permanent magnets mounted in radial slots.

FIG. 2 is a sectional view of the permanent-magnet rotor 7. This rotor consists of a cylindrical yoke 17 of an isotropic magnet material, which has radial slots 18 in which the block-shaped permanent magnets 19 of an anisotropic material are mounted. These permanent magnets 19 are circumferentially magnetised and have directions of magnetisation 20, 21 which change from magnet to magnet in the circumferential direction. In its portions 22 between the permanent magnets 19 mounted in the slots 18 the yoke 17 is predominantly radially magnetised in such a manner that the resulting magnetic field in the air gap 11 has the same polarity as the magnetic field produced by the permanent magnets 19 mounted in the slots 18.

FIG. 3 is a modification of the embodiment shown in FIG. 2, in which the slots 18a have an inclination of approximately 20° relative to the radial direction.

In another embodiment of the invention which is not shown herein, it is also possible that the cylindrical yoke 10 of a soft-magnetic material is disposed at the side of the air gap which faces the permanent magnet 7, behind the coil configuration 9, which yoke is fixedly connected to the permanent magnet 7. This has the advantage that the rotor 7 no longer induces any alternating fields in the cylindrical yoke, so that iron losses do not occur.

I claim:

1. An electric motor with permanent-magnet excitation, comprising: motor parts which are movable relative to one another, wherein one motor part forms a multi-pole excitation field in an air gap by means of permanent magnets and the other motor part comprises a coil configuration situated in the air gap, the permanent-magnetically excited motor part comprising a cylindrical yoke having substantially radial slots uniformly spaced about the circumference in which permanent magnets are mounted, said permanent magnets being magnetized in a circumferential direction with directions of magnetisation which change from magnet to magnet, wherein the cylindrical yoke comprises an isotropic permanent-magnet material which in yoke portions between the permanent magnets is predominantly radially magnetized with such apolarity that the polarity of the resulting magnetic field in the air gap corresponds to the polarity of the magnetic field produced by the permanent magnets, and wherein the permanent magnets in the slots comprise an anisotropic permanent-magnet material.

2. An electric motor as claimed in claim 1, wherein the slots are non-radial and have an inclination between −30° and +30° relative to the radial direction but other than 0°.

3. An electric motor as claimed in claim 1, wherein the coil configuration comprises curved foil windings.

4. An electric motor as claimed in claim 1, wherein the coil configuration comprises curved preformed wound coils.

5. An electric motor as claimed in claim 3, further comprising a cylindrical yoke of a soft-magnetic material disposed at a side of the air gap which faces the permanent magnet, and behind the coil configuration, wherein said yoke is fixedly connected to the coil configuration.

6. An electric motor as claimed in claim 3, further comprising a cylindrical yoke of a soft-magnetic material disposed at a side of the air gap which faces the permanent magnet, and behind the coil configuration is fixedly connected to the permanent magnet.

7. An electric motor as claimed in claim 1, further comprising a cylindrical yoke of a soft-magnetic material disposed at a side of the air gap which faces the permanent magnet, and behind the coil configuration, wherein said yoke is fixedly connected to the coil configuration.

8. An electric motor as claimed in claim 1, further comprising a cylindrical yoke of a soft-magnetic material disposed at a side of the air gap which faces the permanent magnet, and behind the coil configuration, wherein said yoke is fixedly connected to the permanent magnet.

9. The electric motor as claimed in claim 1 wherein said yoke portions are radially magnetized with adjacent yoke portions magnetized in 180° opposite directions.

10. The electric motor as claimed in claim 9 wherein said radial slots are rectangular in shape and support rectangular shaped permanent magnets in which adjacent magnets are oppositely magnetized in the circumferential direction.

11. The electric motor as claimed in claim 1 wherein said radial slots are rectangular in shape and support rectangular shaped permanent magnets in which adjacent magnets are oppositely magnetized in the circumferential direction.

12. The electric motor as claimed in claim 1 wherein said one motor part comprises a rotatable rotor of the motor and which includes the permanent-magnetically excited motor part, and said other motor part comprises the stator of the motor.

Figure 7:
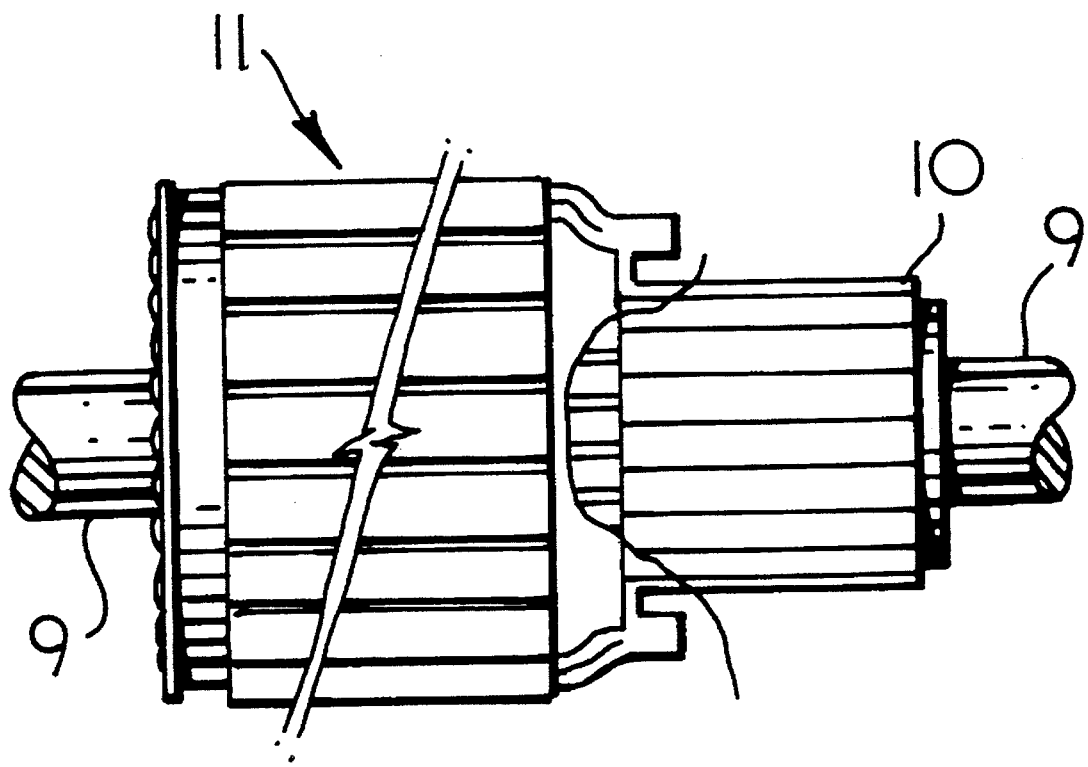
Figure 8:
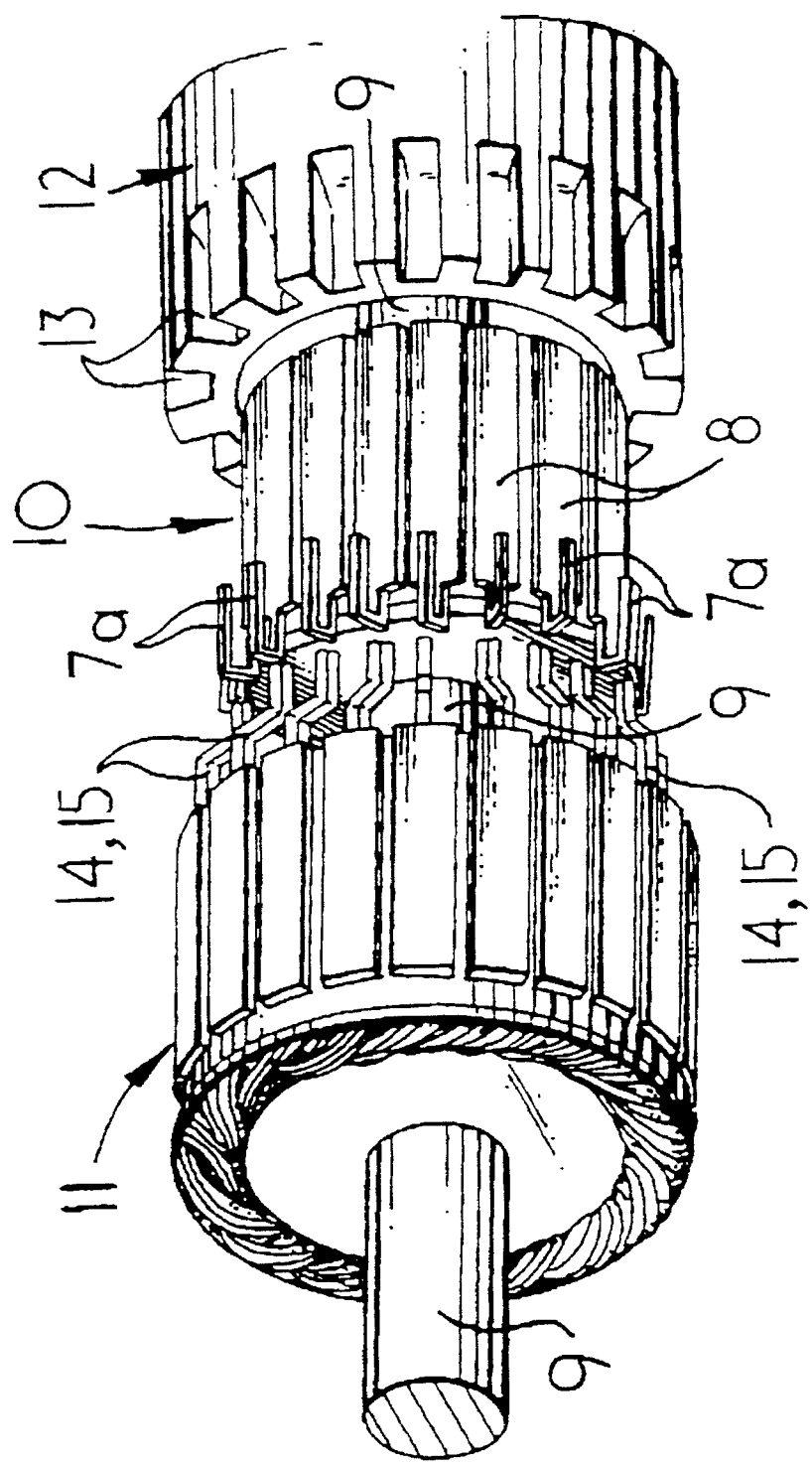

13. The electric motor as claimed in claim 12 wherein said slots are non-radial and form an angle between −30° and member 12 is removed by axial displacement. FIGS. 7 and 8 show a finished armature in accordance with the invention. FIGS. 7 and 9 show the armature subsequent to removal of the supporting member.

It will be appreciated that the apparatus for securing the stack together may consist of brazing apparatus, in which case the support and connecting members may be simple heaters. Alternatively, ultrasonic welding may be used, in which case anvil 12 simply provides mechanical support while the first member 16 is a sonotrode.

The method contemplates the possibility of simultaneously securing several stacks by the simultaneous application of several connecting members. Thus, for example, four stacks may simultaneously be secured by the application of four electrodes, the commutator rotated with respect to the electrodes, and four more stacks secured.

In an alternative embodiment of the apparatus (not shown), the conductor ends may be supported in the stack configuration by being received in a notch in a second connecting member. In this case notches may be unnecessary in the supporting member.

This method of manufacturing an armature presents numerous advantages in comparison with conventional methods of manufacturing high current armatures which require large gauge wires (e.g., in excess of 2 mm$^2$) to form the windings. These include a reduced number of manufacturing steps, reduced consumption of material, reduced energy consumption, the possibility of producing high current armatures of reduced weight and inertia. Because the lugs can be made relatively thin in the circumferential direction it is possible to increase the number of commutator segments and or reduce the diameter of the axial part 8 of the commutator.

I claim:

1. A method of connecting a winding to a segment of a commutator to form an armature for an electric rotary machine comprising the steps of:

positioning end portions of first and second conductors of the winding against a contact surface of a connection portion of the segment to form a stack, engaging a connection member against the stack so that the end portions of the conductors are interposed between the connection member and the contact surface, engaging a support member with a support surface of the connection portion, so that energy can be applied via the connection member and the support member to secure the stack together, and whereby the stack is supported and the connection energies confined to the stack, and disengaging the connection member and the support member from the stack after the stack is secured together.

2. A method according to claim 1 wherein the steps of the method are performed simultaneously upon a fraction of the several segments (5) of the commutator and repeated sequentially on different fractions until all the segments (5) of the commutator have been connected to the conductors of the winding.

3. A method according to claim 1 wherein the end portions of the first and second conductors are secured by electro-welding.

4. A method according to claim 1 wherein the end portions of the first and second conductors are secured by sonic-welding.

5. A method according to claim 1 wherein the connection portion is formed by bending an end of the segment outwardly and back so that the contact surface is formed by the surface of the connection portion facing away from an axis of the commutator, and the support surface is formed on an opposite facing surface of the connection portion.

6. A method according to claim 1 wherein the stack is formed with the first conductor end interposed between the contact surface and the second conductor end.

7. A method according to claim 6 wherein the stack is constructed to extend radially.

8. An apparatus for connecting conductors of a winding to a segment of a commutator to form an armature wherein ends of a conductor are secured to a connection portion of the segment to form a stack, said apparatus comprising:

a connection member engagable with one of the conductor ends to apply energy to the stack to fuse the stack together; and a support member adapted to temporarily engage a support surface of the connection portion to support the stack and to confine the energies applied to fuse the stack during a fusing operation and to be subsequently disengaged from the stack.

9. Apparatus according to claim 8, wherein the support member includes an annular sleeve having an axial bore adapted to receive brush contacting parts of the commutator and a plurality of longitudinally extending, circumferentially spaced notches formed in an outer surface of one end of the sleeve wherein each notch being adapted to receive a stack formed by the commutator connection portion and a pair of conductor ends.

10. Apparatus according to claim 8, wherein the apparatus is adapted to fuse the stack together by hot staking, wherein an electrode is provided in each notch and a complementary electrode is provided by each connection member.

11. Apparatus according to claim 9, wherein the stack is fused together by sonic welding, whereby the connection member includes a sonotrode, and each notch of the support member forms an anvil.

12. Apparatus according to claim 8, further including a plurality of connection members to enable simultaneous fusing of several stacks.

13. A commutator for use in making a high current armature comprising:

a plurality of segments extending circumferentially around a core, each segment having a connection portion adapted to be fused with ends of two conductors of a winding to electrically and mechanically connect each segment with a corresponding pair of conductors, wherein each connection portion having a support surface engagable by a support member whereby the connection portion can be supported while it is fused with a conductor in a stack and allowing said support member to be subsequently separated from the fused stack.

14. A commutator according to claim 13, wherein the connection portion is radially spaced from a brush contact surface of the segment, such that the connection portion overlies the brush contact surface so that the support surface faces an axis of the commutator and the connection surface faces away from the axis.

15. A commutator according to claim 14, wherein the connection portion is radially spaced by bending an end of a segment into a 'U' shape.

* * * * *